Sept. 28, 1948.   W. E. SHIFLET   2,450,304
OUTBOARD MOTOR DOLLY
Filed March 18, 1946

INVENTOR.
WILLIAM E. SHIFLET
BY Edward M. Apple
ATTORNEY

Patented Sept. 28, 1948

2,450,304

UNITED STATES PATENT OFFICE 2,450,304

OUTBOARD MOTOR DOLLY

William E. Shiflet, St. Clair Shores, Mich.

Application March 18, 1946, Serial No. 655,149

5 Claims. (Cl. 280—36)

This invention relates to dollies, and has particular reference to a dolly for supporting and transporting outboard motors, although the device can readily be used to transport boxes, baskets, and other objects.

An object of the invention is the provision of a device of the character indicated which is simple in construction, economical to manufacture, and efficient in operation.

Another object of the invention is the provision of a device of the character indicated which is rugged in construction, although light in weight, and one which may be folded into a comparatively small area for storage or carrying in the trunk of an automobile.

Another object of the invention is the provision of a device of the character indicated which is constructed and arranged in such manner that it may be pulled over uneven surfaces, and through comparatively deep sand or soft earth, without becoming bogged down.

Another object of the invention is the provision of a device of the character indicated which is constructed and arranged in such manner that it may be used to support an outboard motor in upright position when not in use, and may be used to support the outboard motor in horizontal position for cleaning, repairing, and the like.

The foregoing and other objects of the invention will become more apparent as the description proceeds, reference being made from time to time to accompanying drawings:

Fig. 4 is a side elevational view of the device shown in Fig. 2 when it is in folded condition for storing or carrying in an automobile trunk or the like.

Figure 1:
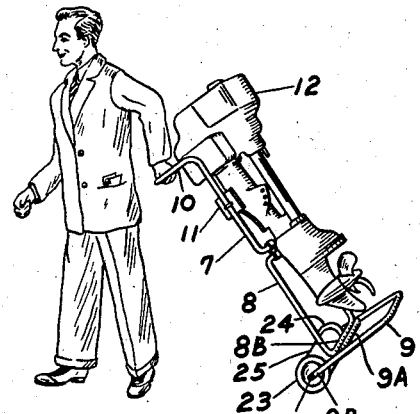
Fig. 1 is a perspective view of the device showing its use in supporting an outboard motor, and showing the manner in which it may be manually pulled.
Figure 6:
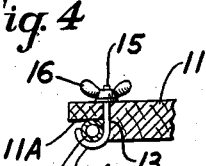
Fig. 6 is a section taken substantially on the line 6—6 of Fig. 3.

Referring now more particularly to the drawing, it will be understood that in the embodiment herein disclosed, my improved dolly consists of upper, intermediate and lower frames 7, 8, and 9, which are preferably formed of light tubular stock, and are secured together as hereinafter described. The upper frame 7 is bent and rebent to form a handle 10, so that the dolly may readily be pulled by an individual as shown in Fig. 1. Slidably secured on the side rails of the frame 7, is a mounting block 11 on which an outboard motor 12 (Fig. 1) may be clamped. The mounting block 11 has its inside corners stepped as at 11A (Fig. 6) to accommodate the side rails of the frame 7, and is bored as at 13, to accommodate hooks 14, which are adapted to engage the side rails of the frame 7. The ends of the hooks 14 are threaded as at 15 to accommodate wing nuts 16, so that the mounting block 11 may be moved to various positions of adjustment on the frame 7, and may be locked in any desired position.

The frames 7 and 8 are hinged together by means of hinges 17 which are formed of continuous lengths of strap metal bent and rebent to accommodate the end rails 7A and 8A of the frames 7 and 8. The hinges 17 are bored to accommodate bolts and wing nuts 18, so that the frames 7 and 8 may be held in substantial frictional engagement. Other types of hinges also may be employed.

Figure 2:
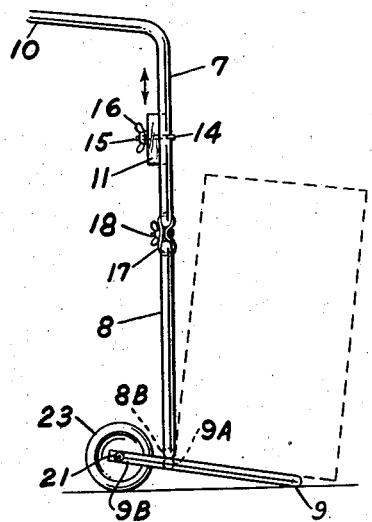
Fig. 2 is a side elevational view of the device showing the manner in which it may be stood in vertical position, and also illustrating the manner in which it might be employed to lift and transport a box or other objects.
Figure 3:
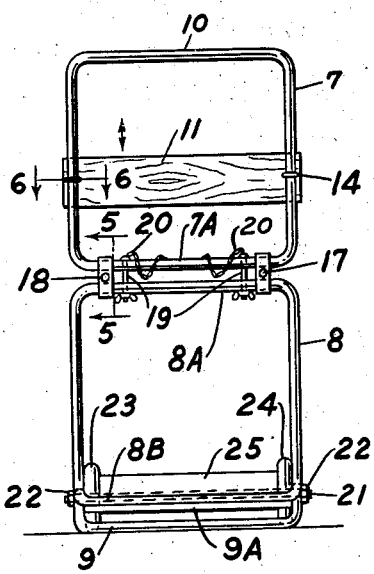
Fig. 3 is a front elevational view of the device illustrated in Fig. 2.
Figure 4:
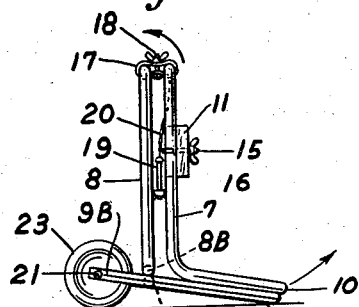
Figure 5:
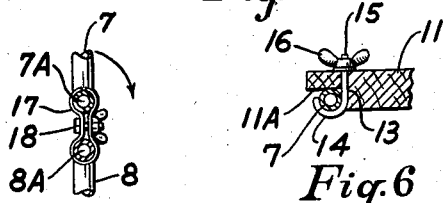
Fig. 5 is a fragmentary detail partly in section, taken on the line 5—5 of Fig. 3.

The members 7A and 8A of the frames are bored to accommodate locking bolts 19, which are adapted to hold the frames 7 and 8 in aligned relation when the device is being used as shown in Figs. 1, 2 and 3. The bolts 19 are preferably mounted at the ends of chains 20, so that they will not become lost when the device is folded as shown in Fig. 4.

The frame 9 comprises a platform, and is secured to the frame 8 by welding the member 9A to the member 8B. The frame 9 has extension members 9B, which are bored to accommodate an axle 21, which is threaded at the ends to accommodate the nuts 22. Mounted for rotation on the axle 21 are wheels 23 and 24 which are provided with suitable bearings adapted to engage the axle 21. The wheels 23 and 24 are preferably welded to the ends of a hollow cylindrical member 25 which rotates with the wheels 23 and 24, and is adapted to support the device in soft earth, sand and the like, which would normally bog down the wheels 23 and 24.

Although I have disclosed certain embodiments of the invention, it will be understood that certain modifications may be made in the device, all of which are within the contemplation of the invention and the scope of the appended claims.

Having described my invention, what I claim and desire to secure by Letters Patent is:

1. In a device of the character described, the combination of a pair of hinged tubular frames of substantially equal size, means to lock said frames in alignment, one of said frames having a mounting block adjustable thereon, the other of said frames having a platform secured thereto, and wheels for supporting the device, there being a comparatively large diameter cylindrical member interposed between said wheels.

2. In a device of the character described, the combination of a pair of hinged tubular frames of substantially equal size, means to lock said frames in alignment, one of said frames having a mounting block adjustable thereon, the other of said frames having a platform secured thereto, and wheels for supporting the device, said wheels being secured to either end of a concentrically mounted cylindrical member.

3. In a device of the character described, the combination of a pair of tubular frames, frictionally engageable hinges between said frames, locking pins engageable with both said frames, a unitary handle portion on one of said frames, a platform secured to the other of said frames, and wheels carried by elements forming part of said platform.

4. The combination defined in claim 3, in which said wheels are secured at either end of a concentrically mounted tubular member having a comparatively large diameter.

5. The combination defined in claim 3, in which one of said frames is provided with an adjustable mounting block.

WILLIAM E. SHIFLET.

REFERENCES CITED

The following references are of record in the file of this patent:

UNITED STATES PATENTS

| Number | Name | Date |
| --- | --- | --- |
| 979,089 | Perry | Dec. 20, 1910 |
| 1,409,838 | Emery et al. | Mar. 14, 1922 |
| 1,747,600 | Reardon | Feb. 18, 1930 |
| 1,790,711 | Johnston | Feb. 3, 1931 |
| 2,405,674 | Schliwa et al. | Aug. 13, 1946 |

FOREIGN PATENTS

| Number | Country | Date |
| --- | --- | --- |
| 416,834 | France | Aug. 16, 1910 |
| 623,169 | France | Mar. 14, 1927 |